(12) United States Patent
Rekaya et al.

(10) Patent No.: US 11,218,218 B2
(45) Date of Patent: Jan. 4, 2022

(54) OPTICAL TRANSMISSION SYSTEM AND METHOD FOR CORE SELECTION IN MULTI-CORE FIBERS

(71) Applicant: INSTITUT MINES-TELECOM, Palaiseau (FR)

(72) Inventors: Ghaya Rekaya, Antony (FR); Akram Abouseif, Paris (FR); Yves Jaouen, Paris (FR)

(73) Assignee: INSTITUT MINES-TELECOM, Palaiseau (FR)

( * ) Notice: Subject to any disclaimer, the term of this patent is extended or adjusted under 35 U.S.C. 154(b) by 0 days.

(21) Appl. No.: 17/050,358

(22) PCT Filed: Apr. 10, 2019

(86) PCT No.: PCT/EP2019/059142
§ 371 (c)(1),
(2) Date: Oct. 23, 2020

(87) PCT Pub. No.: WO2019/206640
PCT Pub. Date: Oct. 31, 2019

(65) Prior Publication Data
US 2021/0058155 A1   Feb. 25, 2021

(30) Foreign Application Priority Data
Apr. 27, 2018   (EP) .................................. 18305539

(51) Int. Cl.
*H04J 14/04*   (2006.01)
*H04B 10/2525*   (2013.01)
(Continued)

(52) U.S. Cl.
CPC ..... *H04B 10/2525* (2013.01); *H04B 10/2581* (2013.01); *H04B 10/50* (2013.01)

(58) Field of Classification Search
CPC ............ H04B 10/2581; H04B 10/0795; H04B 10/2507; H04J 14/04; H04J 14/02; G02B 6/02042; G02B 6/0288; G02B 6/02
(Continued)

(56) References Cited

U.S. PATENT DOCUMENTS

| 9,344,779 B2 * | 5/2016 | Sethumadhavan ...... G02B 6/26 |
| 2014/0314410 A1 * | 10/2014 | Mumtaz ............. H04B 10/2581 398/65 |
| 2017/0264367 A1 | 9/2017 | Awwad et al. |

FOREIGN PATENT DOCUMENTS

EP   3 273 623 A1   1/2018

OTHER PUBLICATIONS

Abouseif, et al., "Core Mode Scramblers for ML-detection based Multi-Core Fibers Transmission", Asia Communications and Photonics Conference, OSA Technical Digest, 2017.
(Continued)

*Primary Examiner* — Hanh Phan
(74) *Attorney, Agent, or Firm* — BakerHostetler (57) ABSTRACT

Embodiments provide an optical transmission system comprising an optical transmitter configured to transmit data over an optical fiber transmission channel comprising a multi-core fiber, the data being carried by one or more optical signals propagating along the multi-core fiber according to a plurality of cores, each core among the plurality of cores being associated with one or more core parameters, wherein the optical transmission system comprises a core selection device configured to select a set of transmit cores among the plurality of cores according to a transmit core selection criterion, the transmit core selection criterion being related to the one or more core parameters, the optical transmitter being configured to transmit the data over the set of transmit cores.

14 Claims, 6 Drawing Sheets

(51) Int. Cl.
*H04B 10/2581* (2013.01)
*H04B 10/50* (2013.01)

(58) Field of Classification Search
USPC ..... 398/79, 44, 158, 159, 147, 162, 81, 195,
398/194, 25, 26, 27, 38, 33, 141;
385/123, 124, 126, 24
See application file for complete search history.

(56) References Cited

OTHER PUBLICATIONS

Zhu, et al., "Space-, Wavelength-, Polarization-Division Multiplexed Transmission of 56-Tb/s over a 76.8-km Seven-Core Fiber", Optical Fiber Communication Conference/National Fiber Optic Engineers Conference 2011, Mar. 6, 2011.

Zhu, et al., "Seven-core multicore fiber transmissions for passive optical network", Optical Express, May 11, 2010.

\* cited by examiner

OPTICAL TRANSMISSION SYSTEM AND METHOD FOR CORE SELECTION IN MULTI-CORE FIBERS

CROSS-REFERENCE TO RELATED APPLICATIONS

This application is a National Stage of International patent application PCT/EP2019/059142, filed on Apr. 10, 2019, which claims priority to foreign European patent application No. EP 18305539.1, filed on Apr. 27, 2018, the disclosures of which are incorporated by reference in their entirety.

TECHNICAL FIELD

The invention generally relates to optical communications and in particular to devices and methods for core selection in multi-core fibers.

BACKGROUND

Over the past decades, the demand for network bandwidth has dramatically grown. The amount of the traffic in optical communication networks was mainly caused by the increase of Internet traffic generated by the increasing number of users and applications.

Frequency, time, phase, and polarization have been exploited to meet the users' demands for bandwidth. Further, the practical use of wavelength division multiplexing (WDM), coherent detection and polarization division multiplexing (PDM) along with advanced signal processing enabled improvement of transmission capacities and reach of optical communication systems using single-mode fibers.

However, WDM-PDM systems using conventional single mode fibers, with a small core radius where waves propagate along a single propagation mode, almost reached the non-linear capacity limit of optical transmission systems and cannot cope with the exponential growth in the demand for higher network bandwidth. Space remains the last degree of freedom that can be used in optical transmission systems to increase reach and capacity. Space is used as a multiplexing dimension for the creation of a plurality of independent spatial channels over which independent data streams can be multiplexed and carried in the same fiber. Using Space Division Multiplexing (SDM), the capacity can be multiplied by the number of independent spatial channels, thus increasing both the reach and the transmission capacities of optical fiber transmission links.

SDM can be realized through multi-mode fibers (MMFs) or multi-core fibers (MCFs). Multi-mode fibers allow the propagation of light according to many spatial propagation modes. The core of a multi-mode fiber is enlarged to allow the propagation of more than one spatial mode. The number of reflections created as the light passes through the core increases, creating the ability to propagate more data at a given time slot. Multi-core fibers incorporate multiple identical or different cores in a single fiber, each core being single-mode or multi-mode.

Multi-mode fibers can offer higher transmission rates than single-mode fibers. However, multi-mode fibers are affected by several impairments mainly due to imperfections of the optical components (e.g. fibers, amplifiers, multiplexers), the crosstalk effects between the spatial modes, and non-unitary crosstalk effects known as mode dependent loss (MDL).

Multi-core fibers can be classified into uncoupled and coupled MCFs.

In uncoupled MCFs, each core has to be suitably arranged to keep the inter-core crosstalk sufficiently small for long distance transmission applications to detect signals from each core separately (i.e. no multiple-input multiple-output equalization is required at receiver). Several types of uncoupled multi-core fibers have been designed according to different core arrangements. These designs comprise 'homogeneous MCFs' and 'homogeneous with trench-assisted MCFs' incorporating multiple identical cores, and heterogeneous MCFs' incorporating multiple cores of several types.

In coupled MCFs, several cores are placed so that they strongly and/or weakly couple with each other. Coupled MCFs supporting a single spatial mode and multiple spatial modes can be used in high-power fiber laser applications.

Multi-core fibers are affected by several impairments due to the misalignment losses and crosstalk effects. The crosstalk and misalignment losses induce a core dependent loss (CDL). The CDL is an impairment effect similar to the MDL affecting multi-mode fibers.

The misalignment losses rise due to the imperfections of the optical fiber at the splices and connector part. Three types of misalignment losses exist comprising the longitudinal displacement losses, the transverse displacement losses, and angular displacement losses.

The crosstalk effect is due to the existence of multiple cores in one cladding which generates a crosstalk between the neighboring cores. The crosstalk increases with a smaller inter-core distance and represents the main limitation to the capacity in terms of the optical signal quality and the number of cores integrated inside a multi-core fiber. Further, low crosstalk effects enable a decoding complexity reduction at the optical receiver since no multiple-input multiple-output equalization is required for small crosstalk values.

Several optical solutions exist and can be applied during the manufacturing of the optical fibers in order to reduce the crosstalk effect.

A first approach consists in increasing the inter-core distance. This approach enables reducing the crosstalk effect, however it limits the number of cores inside the fiber due to the cladding diameter and consequently it decreases the core density and capacity.

A second approach is based on trench assistance with the use of trench-assisted homogeneous multi-core fibers. Trench assistance reduces the coupling coefficients by surrounding each core with a low-index trench layer. The crosstalk in trench-assisted fiber designs is independent of the inter-core distance.

A third solution uses heterogeneous MCFs in which an intrinsic index difference between neighbor cores is introduced, enabling reducing the crosstalk effect.

Further, a random core scrambling technique, disclosed in "A. Abouseif, G. R. Ben-Othman, and Y. Jaouën, Core Mode Scramblers for ML-detection based Multi-Core Fibers Transmission, in Asia Communications and Photonics Conference, OSA Technical Digest, 2017", has been recently proposed to mitigate the CDL in heterogeneous trench-assisted MCFs and to enhance the system performance. In such an article, it is indicated that random core scrambling enables achieving better performance in terms of error probabilities. However, random scrambling requires installing a large number of random scramblers which induces an additional implementation complexity and cost on the transmission system.

Although existing solutions enable a reduction of the crosstalk effects in multi-core fibers, they are sub-optimal and do not allow a complete removal of the crosstalk. There is accordingly a need for developing transmission techniques enabling the minimization of the crosstalk effects in multi-core fibers.

SUMMARY

In order to address these and other problems, there is provided an optical transmission system comprising an optical transmitter configured to transmit data over an optical fiber transmission channel comprising a multi-core fiber. Data is carried by one or more optical signals propagating along the multi-core fiber according to a plurality of cores, each core among the plurality of cores being associated with one or more core parameters. The optical transmission system comprises a core selection device configured to select a set of transmit cores among the plurality of cores comprising at least one transmit core according to a transmit core selection criterion, the transmit core selection criterion being related to the one or more core parameters, the optical transmitter being configured to transmit the data over the set of transmit cores.

According to some embodiments, a core parameter may be chosen in a group comprising a core type, a core loss value, an average received energy, and a number of neighbor cores.

According to some embodiments, the core selection device may be configured to apply a transmit core selection criterion consisting in selecting, a number of the cores which are associated with the highest average received energy.

In some embodiments in which the multi-core fiber is homogeneous, the core types associated with each of the plurality of cores being identical, the core selection device may be configured to apply a transmit core selection criterion consisting in selecting a number of the cores which are associated with the smallest number of neighbor cores.

According to some embodiments in which the multi-core fiber is homogeneous and comprises an even number of cores, the core selection device may be configured to group the plurality of cores into pairs of cores, each pair of cores comprising two neighbor cores. In such embodiments, the core selection device may be configured to apply a the transmit core selection criterion consisting in selecting a core among each pair of cores.

According to some embodiments in which the multi-core fiber is heterogeneous, the core selection device may be configured to apply a transmit core selection criterion consisting in selecting a number of the cores which are associated with a predefined core type.

According to some embodiments in which the multi-core fiber is heterogeneous, the core selection device may be configured to apply a transmit core selection criterion consisting in selecting a number of the cores which are associated with the highest core loss values.

According to some embodiments, the multi-core fiber may be associated with fiber parameters and misalignment loss values, the core selection device being configured to determine each core loss value associated with each core of the multi-core fiber depending on the fiber parameters and the misalignment loss values.

According to some embodiments, the fiber parameters may comprise a fiber length, a number of cores at least equal to two, crosstalk coefficients, and coupling coefficients, each crosstalk coefficient representing a crosstalk between two cores in the multi-core fiber, each coupling coefficient representing a coupling between two cores in the multi-core fiber.

According to some embodiments, misalignment loss values may represent a misalignment of the multi-core fiber chosen in a group comprising a longitudinal misalignment, a transverse alignment, and an angular alignment.

According to some embodiments, the core selection device may be configured to determine each core loss value associated with each core of the multi-core fiber as a random variable of a lognormal distribution defined by a mean value and a variance value, the mean value and variance value being dependent on the fiber parameters and the misalignments loss values.

According to some embodiments, the mean value of each core loss value associated with each core of the multi-core fiber may be a product between a first value and a second value, the first value corresponding to the mean of a lognormal random variable representing a total misalignment loss associated with each core, the second value corresponding to a total crosstalk coefficient associated with each core, the total crosstalk coefficient associated with a given core being determined from the crosstalk coefficients representing the crosstalk between said given core and the cores of the multi-core fiber different from said given core, the variance value of each core loss value associated with each core of the multi-core fiber being the product between the square of the total crosstalk coefficient associated with said each core and a third value corresponding to the variance of said lognormal random variable representing the total misalignment loss associated with said each core.

According to some embodiments, the optical transmission system further comprises an optical receiver configured to receive and decode the optical signals carrying data transmitted over the set of transmit cores, the core selection device being further configured to select a set of receive cores among the plurality of cores according to a receive core selection criterion, the optical receiver being configured to receive and decode the optical signals using the set of receive cores.

According to some embodiments, the core selection device may be configured to perform core selection by selecting a set of transmit cores and/or a set of receive cores adaptively or periodically taking into account any replacement of optical components of the optical transmission system.

There is also provided a method for core selection in an optical transmission system in which data is transmitted over an optical fiber transmission channel comprising a multi-core fiber, data being carried by one or more optical signals propagating along the multi-core fiber according to a plurality of cores, each core among the plurality of cores being associated with one or more core parameters. The method comprises selecting a set of transmit cores comprising at least one transmit core among the plurality of cores according to a transmit core selection criterion, the transmit core selection criterion being related to the one or more core parameters, the method comprising transmitting the data over the set of transmit cores.

Advantageously, the core selection techniques according to the various embodiments of the invention enable an optimized selection and use of the available cores in the multi-core fiber for transmitting data while reducing the optical channel impairments in terms of the crosstalk effects.

Advantageously, the core selection techniques according to the various embodiments of the invention provide efficient tools for exploiting the cores associated with the maximum average received energy for improved transmission over the optical transmission channel.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention.

DETAILED DESCRIPTION

Embodiments of the present invention provide core selection devices and methods in a multi-core optical fiber transmission system, that enable efficient transmission over the multi-core fiber transmission system with a reduced effect of the core-to-core crosstalk and the core dependent loss impairments.

Devices and methods according to the various embodiments of the invention may be implemented in optical fiber transmission systems applied to a wide variety of applications. Exemplary applications comprise, without limitation, optical fiber communications, aerospace and avionics, data storage, automotive industry, imaging, transportation, sensing, and photonics.

Exemplary communication applications comprise desktop computers, terminals, and nationwide networks. Optical fibers may be used to transmit light and thus information/data over short distances (less than one meter) or long distances (up to hundreds or thousands of kilometers for example in communications over metropolitan networks, wide area networks, transoceanic links). Such applications may involve transfer of voice (e.g. in telephony), data (e.g. data supply to homes and offices known as fiber to the home), images or video (e.g. transfer of internet traffic), or connection of networks (e.g. connection of switches or routers and data center connectivity in high-speed local area networks).

In an exemplary implementation of the invention in the field of aerospace and avionics industries, optical fiber-based products may be used in military and/or commercial applications. Optical fiber technologies and products are designed in such applications to meet rigorous testing and certifications requirements in harsh environments and conditions.

In an exemplary implementation of the invention in data storage applications, optical fibers may be used in data storage equipments as a link between multiple devices in a network and/or as part of a storage system. Optical fiber connectivity offers very high bandwidth even over extended distances.

In another exemplary application of the invention to automotive industry, optical fiber technologies may be used for example in lighting/illumination, communications, and sensing for safety and control devices and systems.

In still another exemplary implementation of the invention in imaging applications (e.g. telemedicine), the optical transmission properties of the optical fibers may be used to transmit an image of a target or a subject area to the image view end for analysis and/or interpretation.

The invention may be used in transportation systems, in which smart highways with intelligent traffic lights, automated tollbooths and changeable message signs may use telemetry systems based on optical fibers.

The invention may further be used in sensing applications, where optical fiber sensors are used for sensing some quantities such as temperatures, displacements, vibrations, pressure, acceleration, rotations, and concentration of chemical species. Exemplary applications of optical fiber sensors comprise sensing in high voltage and high-power machinery or in microwaves, distributed temperature and strain measurements in buildings for remote monitoring (e.g. monitoring of the wings of airplanes, wind turbines, bridges, pipelines), downhole sensing in oil exploration applications, etc.

In another application of the invention to photonics, optical fibers may be used for connecting components in optical fiber devices, such as interferometers and fiber lasers. In such application, optical fibers play a similar role as electrical wires do in electronic devices.

The following description of certain embodiments will be made with reference to communication applications, for illustration purposes only. However, the skilled person will readily understand that the various embodiments of the invention may be applied to other types of systems for different applications.

Figure 1:
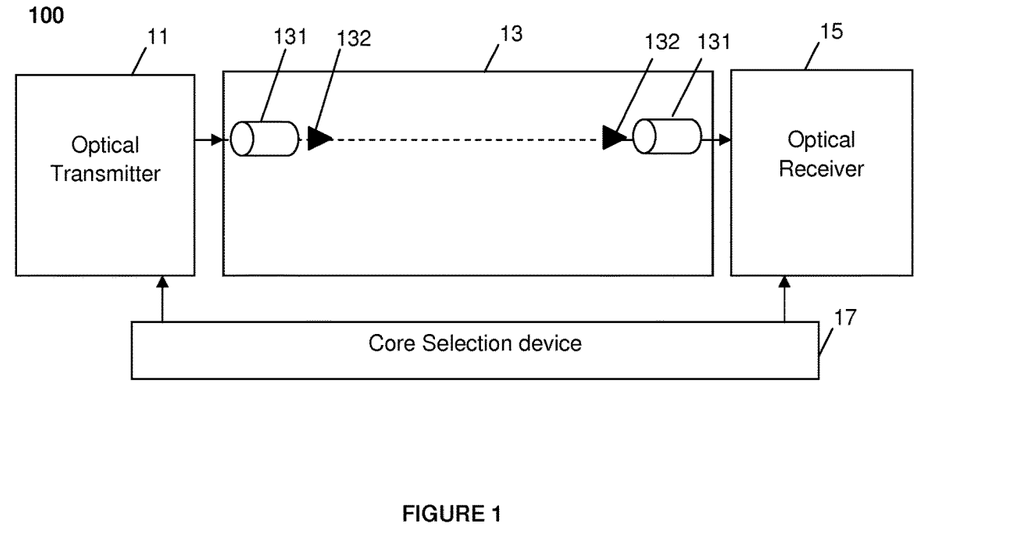
FIG. 1 illustrates a schematic diagram of an exemplary application of the invention in optical communication systems.

FIG. 1 illustrates an exemplary implementation of the invention in an optical transmission system 100 (also referred to as 'optical communication system') based on optical fiber transmissions. The optical transmission system 100 comprises at least one optical transmitter device 11 (hereinafter referred to as an "optical transmitter") configured to encode an input data sequence into an optical signal and transmit the optical signal optically to at least one optical receiver device 15 (hereinafter referred to as an "optical receiver") through an optical fiber transmission channel 13 (hereinafter referred to as an 'optical fiber link') configured to transmit the light over some distance.

The optical communication system 100 may comprise computers and/or softwares to control the system operability.

The optical fiber transmission channel 13 comprises a multi-core fiber comprising a concatenation of a plurality of fiber sections 131 (also referred to as 'fiber span' or 'fiber slice'). The fiber sections 131 may be aligned or misaligned.

The multi-core fiber is a cylindrical non-linear waveguide consisting of two or more cores, a cladding surrounding the two or more cores, and a coating. The multi-core fiber guides electromagnetic waves in the optical spectrum. Each core has a refractive index. The optical signal sent by the optical transmitter 11 is multiplexed and is guided in each core of the multi-core fiber through total internal reflections due to the difference between the refractive indices of the cores and the refractive index of the cladding. Light carries data and allows transmission over long distances at higher bandwidths than in wire-based and wireless communication systems.

In some embodiments in which the multi-core fiber is an uncoupled fiber, each core of the multi-core fiber may act as a separate waveguide such that the optical signal can be considered as propagating independently trough the cores.

In some embodiments in which the multi-core fiber is a coupled fiber, some coupling may exist between the cores if the distance between two cores is so small that the optical signals propagating along the different cores overlap.

The optical fiber may be made of glass (e.g. silica, quartz glass, fluoride glass), typically for long-distance transmissions. For short distance transmissions, the optical fiber may be a plastic optical fiber.

The multi-core fiber may be characterized by geometrical parameters and optical parameters. Geometrical parameters may comprise the cladding diameter, the core-to-core distance, and the core-outer cladding distance. Optical parameters may comprise the wavelength, the crosstalk coefficients representing the crosstalk between the different cores of the multi-core fiber, and the refractive index difference between each core and the cladding.

In some embodiments, the optical fiber communication system 100 may operate in a wavelength region corresponding to a region chosen in a group comprising:
- the window of wavelengths ranging in 800-900 nm, suitable for short-distance transmissions;
- the window of wavelengths around 1.3 µm, used for example for long-haul transmissions;
- the window of wavelengths around 1.5 µm, more used since the losses of silica fibers are lowest in this wavelength region.

Figure 2:
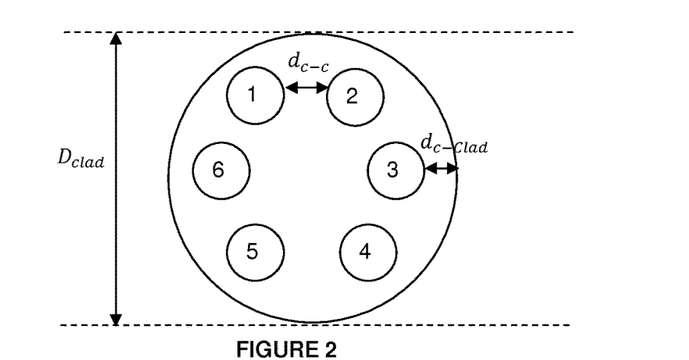
FIG. 2 illustrates a cross section view of an exemplary multi-core fiber.

FIG. 2 depicts a cross section view of a six-cores fiber, $D_{clad}$ representing the cladding diameter, $d_{c-c}$ designating the inter-core distance, and $d_{c-Clad}$ representing the core-outer cladding distance.

In some embodiments, the cores in the multi-core fiber may be arranged on a ring around the fiber axis for example on the edges of a hexagon. In other embodiments, the cores may be arranged on some 2-dimensional grid.

In an embodiment, the multi-core fiber may be a homogeneous multi-core fiber comprising two or more cores of identical types.

Figure 3:
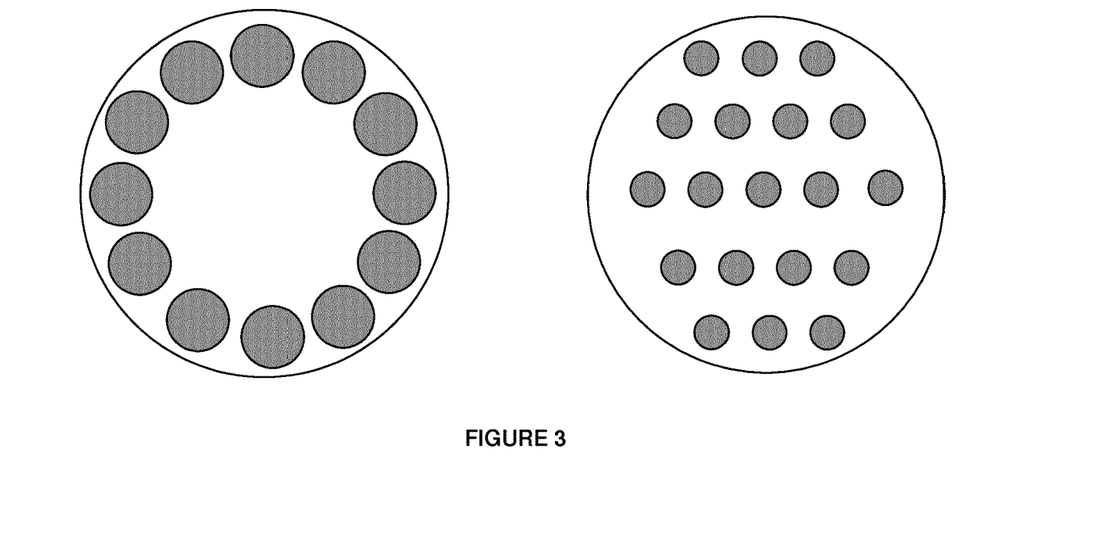
FIG. 3 depicts cross section views of two multi-core fibers, with a 12-cores homogeneous multi-core fiber comprising twelve cores arranged on a ring around the fiber axis and a 19-cores homogeneous fiber, according to an embodiment.

FIG. 3 depicts cross section view of two exemplary homogeneous multi-core fibers, a first 12-cores fiber comprising 12 cores of identical types arranged on a ring around the fiber axis, and a second 19-cores fiber comprising 18 cores arranged on the edges of the hexagon and a central core.

In an embodiment, the multi-core fiber may be a homogeneous trench-assisted multi-core fiber, each core being surrounded by a low-index trench layer.

Figure 4:
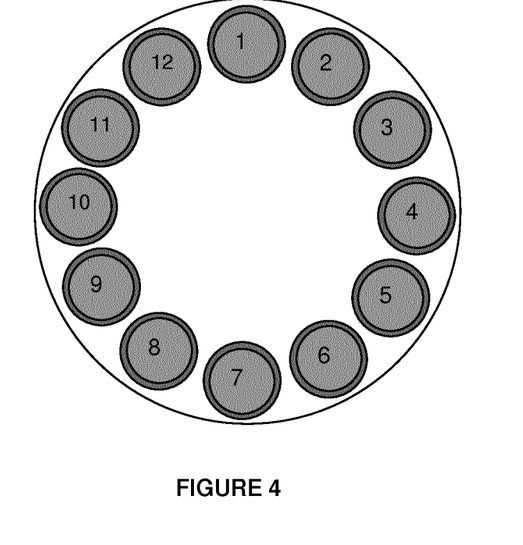
FIG. 4 depicts a cross section view of a 12-cores homogeneous trench-assisted multi-core fiber, according to an embodiment.

FIG. 4 illustrates a cross section view of an exemplary trench-assisted homogeneous multi-core fiber comprising 12 cores of identical types.

In another embodiment, the multi-core fiber may be a heterogeneous multi-core fiber comprising a plurality of cores among which at least two cores are of different types.

Figure 5:
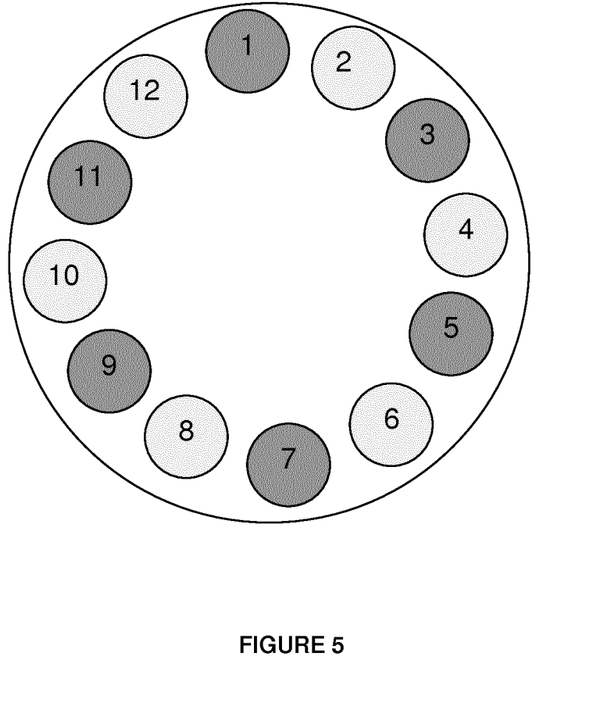
FIG. 5 illustrates a cross section view of a 12-cores heterogeneous multi-core fiber comprising twelve cores arranged on a ring around the fiber axis, according to an embodiment.

FIG. 5 illustrates a cross section view of an exemplary heterogeneous multi-core fiber comprising 12 cores among which cores numbered $2i+1$ with $i=0, \ldots, 5$ are identical, the cores numbered $2i+2$ with $i=0, \ldots, 5$ are identical, and the cores numbered $2i+1$ are of a core type different from the core type of the cores numbered $2i+2$ for $i=0, \ldots, 5$. Each core in such heterogeneous multi-core fiber has two neighbors, each core having a core type different from the core type of its neighbor cores.

Figure 6:
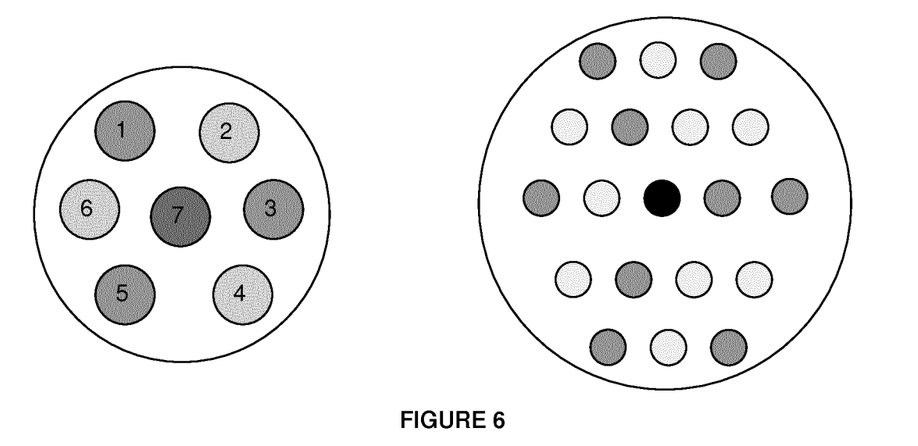
FIG. 6 illustrates cross sections views of two multi-core fibers, comprising a 7-cores heterogeneous fiber comprising seven cores and a 19-cores heterogeneous fiber comprising three groups of cores, with the cores of each the different groups having different types, according to another embodiment.

FIG. 6 illustrates cross section views of two exemplary 7-cores fiber and 19-cores heterogeneous fibers. The 7-cores fiber comprises comprising six cores on the edges of the hexagon numbered 1-6 and a central core numbered 7. This 7-cores fiber involves three different core types, the central core having a core type different from the types of the cores on the edges of the hexagon, and each core arranged on the edges of the hexagon having a core type different from the core type of its neighbor cores. The 19-cores fiber comprises three different core types, the central core having a core type different from the types of the cores on the edges of the hexagon.

In an embodiment, the multi-core fiber may be a trench-assisted heterogeneous multi-core fiber.

Figure 7:
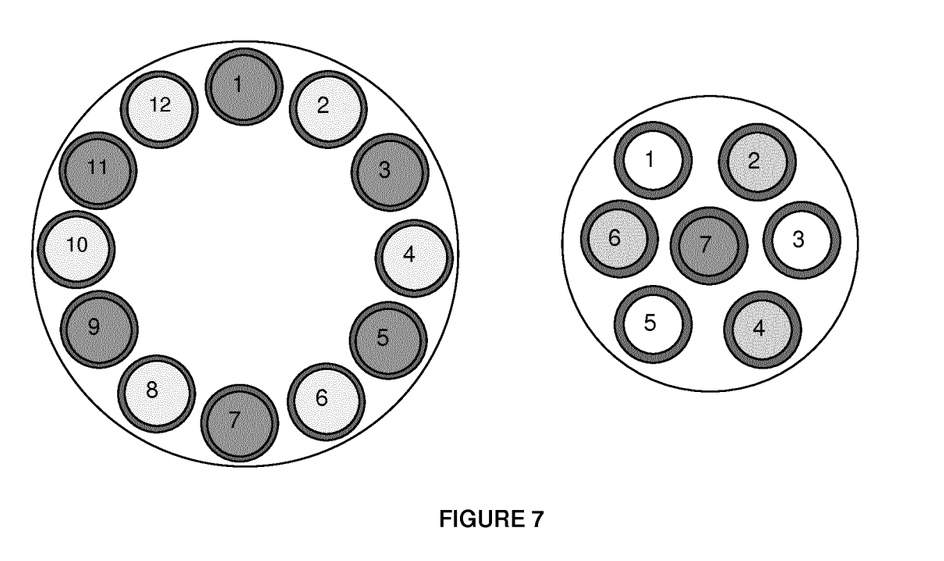
FIG. 7 illustrates two cross sections views of two multi-core fibers, with a 12-cores heterogeneous trench-assisted multi-core fiber comprising twelve cores arranged on a ring around the fiber axis and a 7-cores heterogeneous trench-assisted fiber, according to some embodiments.

FIG. 7 depicts cross section views of two exemplary 12-cores and 7-cores trench-assisted heterogeneous multi-core fibers.

In some embodiments, each core of the multi-core fiber may be single mode comprising one spatial propagation mode.

In some embodiments, the multi-core fiber may comprise at least one multi-mode core comprising two or more spatial propagation modes.

The optical fiber transmission channel 13 may further comprise one or more amplifiers 132 inserted in the fiber for re-amplifying the optical power and compensating for the fiber attenuation without the need to regenerate the optical signals such that a sufficient signal power can be maintained over large distance where optical signals need to be periodically amplified.

The amplifiers 132 may be inserted between each pair of fiber slices 131 and may operate at a constant power to raise the power of the optical signal to its initial value as at the transmitter. In particular, an amplifier 132 inserted at the end of the optical fiber transmission channel performs signal amplification before signal detection at the receiver 15.

Each amplifier 132 may be configured to simultaneously amplify the optical signal corresponding to the plurality of cores in the multi-core fiber.

In some embodiments, the amplifiers 132 may consist of a duplication of a single core fiber amplifier.

In other embodiments, an amplifier 132 may be an optical multi-core amplifier. Exemplary optical amplifiers comprise multi-core Erbium doped fiber amplifiers (EDFAs) such as core-pumped multi-core EDFAs and cladding-pumped EDFA amplifiers. Core-pumped and cladding pumped amplifiers may use a single or a plurality of pump diodes. In particular, a pump diode per core may be used in EDFA amplifiers.

In some embodiments, the optical signal amplification may be performed in a distributed manner using the non-linear simulated Raman scattering effect. In such embodiments, the fiber is used as both a transmission link and an amplification medium.

In other embodiments, signal amplification may be achieved by a joint use of regularly arranged optical amplifiers and of simulated Raman Scattering effects.

In still other embodiments, the signal amplification may be performed in the electrical domain through an optical/electrical conversion (not illustrated in FIG. 1). In such embodiments, the optical fiber transmission channel 13 may comprise, at each amplification stage:
- a photodiode for converting the optical signal back to the electrical domain;
- an electrical amplifier for amplifying the converted electrical signal; and
- a laser diode for generating an optical signal corresponding to the amplified electrical signal.

According to some embodiments (not illustrated in FIG. 1), the optical transmission channel 13 may further comprise one or more of:
- dispersion compensators for counteracting the effects of chromatic dispersion, a dispersion compensator being configured to cancel the chromatic dispersion or compensate the dispersion for example before the detection of the optical signal at the receiver 15;
- optical switches and optical multiplexers such as optical add/drop multiplexers implemented in wavelength division multiplexing systems;
- one or more devices for regenerating the optical signal such as electronic and optical regenerators.

Figure 8:
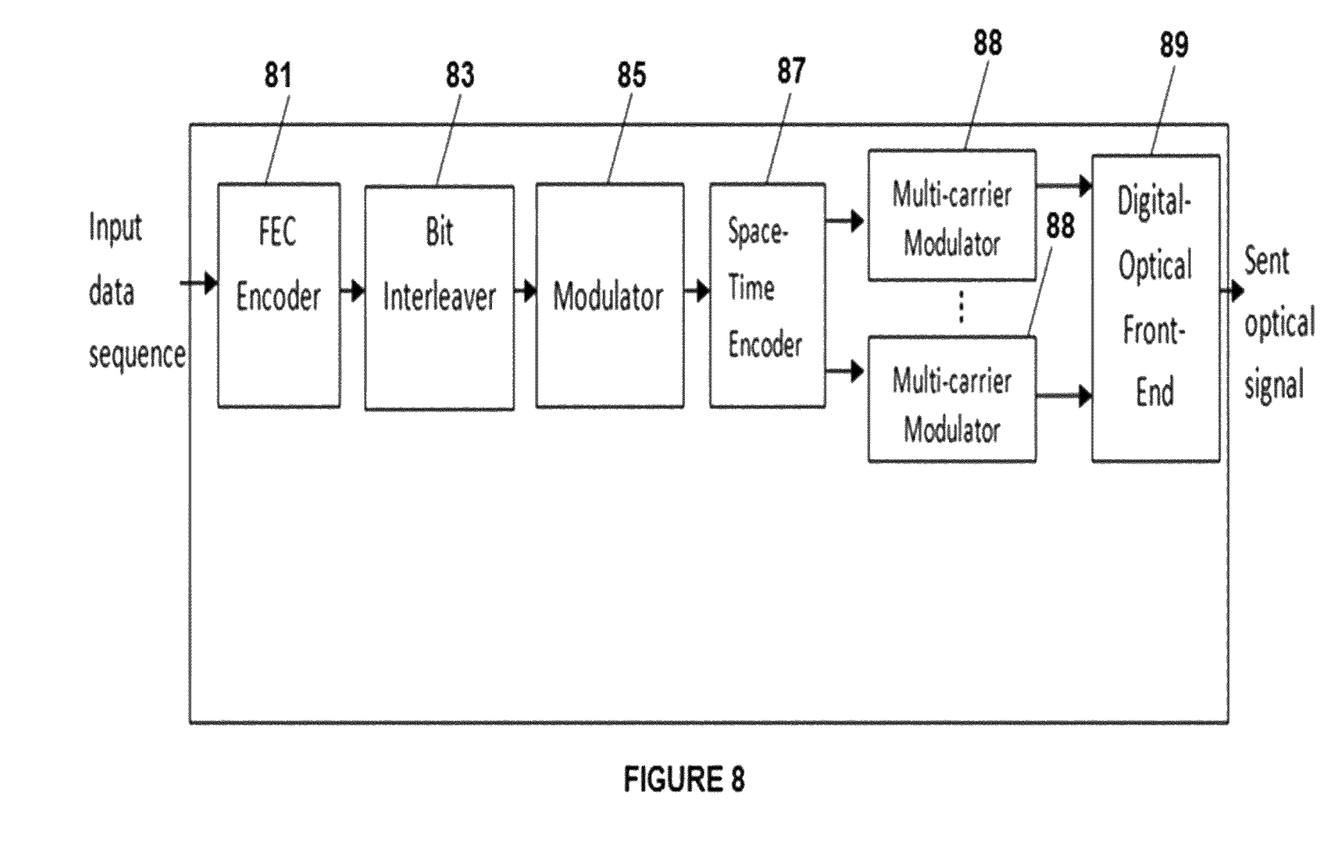
FIG. 8 is a block diagram illustrating the structure of an optical transmitter according to some embodiments of the invention.

FIG. 8 shows the components of an optical transmitter 11 according to some embodiments. The optical transmitter 11 may be configured to transform an input data sequence into an optical signal to be transmitted through the optical transmission channel 13. Accordingly, the optical transmitter 11 may comprise:
- a Forward Error Correcting code (FEC) encoder 81 (also referred to as 'an error correcting code encoder 81') configured to encode an input data sequence of length k (i.e. comprising k symbols) into an encoded sequence in the form of a codeword vector of length n>k by applying at least one Forward Error Correcting code (FEC) (also referred to as 'an error correcting code');
- an interleaver 83 configured to mix the encoded sequence to add a protection layer to the encoded symbols against burst errors before being modulated;
- a modulator 85 configured to determine a set of modulated symbols in a form of a modulated symbol vector $s_c$ by applying a modulation scheme to the interleaved encoded sequence (or to the codeword vectors in embodiments where the transmitter 11 does not comprise an interleaver). Different modulation schemes may be implemented such as $2^q$-QAM or $2^q$-PSK with $2^q$ symbols or states. The modulated vector $s_c$ may be a complex-value vector comprising $\kappa$ complex-value symbols $s_1, s_2, \ldots, s_\kappa$ with q bits per symbol. When modulation formats such as $2^q$-QAM are used, the $2^q$ symbols or states represent a sub-set of the integer field Z[i]. The corresponding constellation is composed of $2^q$ points representing the different states or symbols. In addition, in the case of squared modulations, the real and imaginary parts of the information symbols belong to the same finite alphabet $A=[-(q-1),(q-1)]$;
- a Space-Time Encoder 87 configured to determine a codeword matrix carrying the data symbols to be sent through the optical transmission channel 13 during a Time Transmission Interval (TTI) by applying a Space-Time code. The Space-Time encoder 25 may be configured to transform each received sequence (or block) of Q modulated symbols $s_1, s_2, \ldots, s_Q$ into a codeword matrix X of dimensions $N_t \times T$. A codeword matrix comprises complex values arranged in $N_t$ rows and T columns where $N_t$ designates the number of propagation cores used for propagating optical signals and T designates the temporal length of the Space-Time code and corresponds to the number of temporal channel uses. Each value of a codeword matrix accordingly corresponds to a time of use and to a propagation core used for the signal propagation. The Space-Time Encoder 87 may use a linear Space-Time Block Code (STBC) to generate the codeword matrix. The coding rate of such codes is equal to $\kappa/T$ complex symbols per channel use, where $\kappa$ is the number of encoded complex-value symbols composing the vector $s_c=[s_1, s_2, \ldots, s_\kappa]^t$ of dimension $\kappa$ in this case. When full-rate codes are used, the Space-Time Encoder 87 encodes $\kappa=N_t T$ complex-value symbols. Examples of STBCs are the Perfect Codes. The Perfect Codes provide full coding rates by encoding a number $\kappa=N_t^2$ ($T=N_t$) of complex information symbols and satisfy a non-vanishing determinant property.

In some embodiments, the Space-Time Encoder 87 may use a spatial multiplexing scheme known as V-BLAST scheme by multiplexing the received complex-value information symbols over the different propagation cores, without performing a coding in the time dimension.

According to some embodiments, the input data sequence may be a binary sequence comprising k bits. The FEC encoder 81 may be configured, in such embodiments, to encode the input binary sequence into a binary codeword vector comprising n bits by applying at least one binary FEC code.

In other embodiments, the input data sequence may comprise symbols that take values in a Galois Field GF(q) with q>2 representing the order of the Galois Field. In such embodiments, the FEC encoder 22 may be configured to encode the input data sequence into a codeword vector comprising n symbols, each symbol comprised in the codeword vector takes value in the Galois Field GF(q). The encoding process in this case may be performed using a non-binary FEC code constructed over GF(q) with q>2.

By performing the coding operation, the FEC encoder 81 adds redundant bits (in general redundant symbols) to the input binary sequence so that the receiver can detect and/or correct common transmission errors. The use of a FEC code provides an additional protection and immunity against transmission errors and allows significant improvement in performance with respect to uncoded transmission (i.e. transmission of modulated data without FEC encoding).

Additional improvements and reduction on the probability of error may be achieved through the concatenation of two or more FEC codes. Concatenation of codes may follow a serial, a parallel, or a multi-level architecture. The FEC encoder 81 may be accordingly configured to implement two or more FEC codes.

The optical transmitter 11 may further comprise a plurality of multi-carrier modulators 88 configured to generate multi-carrier symbols by implementing a multi-carrier modulation technique within each optical carrier involving a large number of orthogonal sub-carriers. Moreover, multi-carrier modulations may be implemented for providing a better resistance to the inter-symbol interference resulting from the fiber dispersion and crosstalk between the various cores in the multi-core fiber. Exemplary multi-carrier modulation formats comprise Orthogonal Frequency Division Multiplexing (OFDM) and Filter Bank Multi-Carrier (FBMC).

The frequency-domain signal delivered by the multicarrier modulators 88 may be then processed by a digital-optical Front-End 89 configured to convert the received frequency-domain signal to the optical domain. The digital-optical Front-End 88 may perform the conversion using a number of lasers of given wavelengths and a plurality of optical modulators (not shown in FIG. 8) associated with the used polarization states and the spatial propagation modes in the cores of the multi-core fiber. A laser may be configured to generate a laser beam of a same or different wavelength using Wavelength Division Multiplexing (WDM) techniques. The different laser beams may be then modulated using the different outputs of the OFDM symbols (or the different values of the codeword matrix in embodiments using single-carrier modulations) by means of the optical modulators and polarized according to the different polarization states of the fiber. Exemplary modulators comprise Mach-Zehnder modulators. A phase and/or amplitude modulation may be used. In addition, the modulation scheme used by the various optical modulators for modulating the different optical signals may be similar or different.

The number of the optical modulators and lasers depends on the number of used polarization states, the number of used propagation modes in each core of the multi-core fiber, and on the number of cores in the fiber.

The digital-optical front-end 88 may further comprise a FAN-IN device (not illustrated in FIG. 8) configured to inject the generated optical signals into each core of the multi-core fiber to propagate according to the available propagation modes in each core. Optical connectors may be used to connect the output end of the FAN-IN device and the input end of the multi-core optical transmission channel 13.

The optical signals generated according to any of the preceding embodiments may propagate along the fiber until reaching the other end of the optical transmission channel 13 where it is processed by an optical receiver 15.

Figure 9:
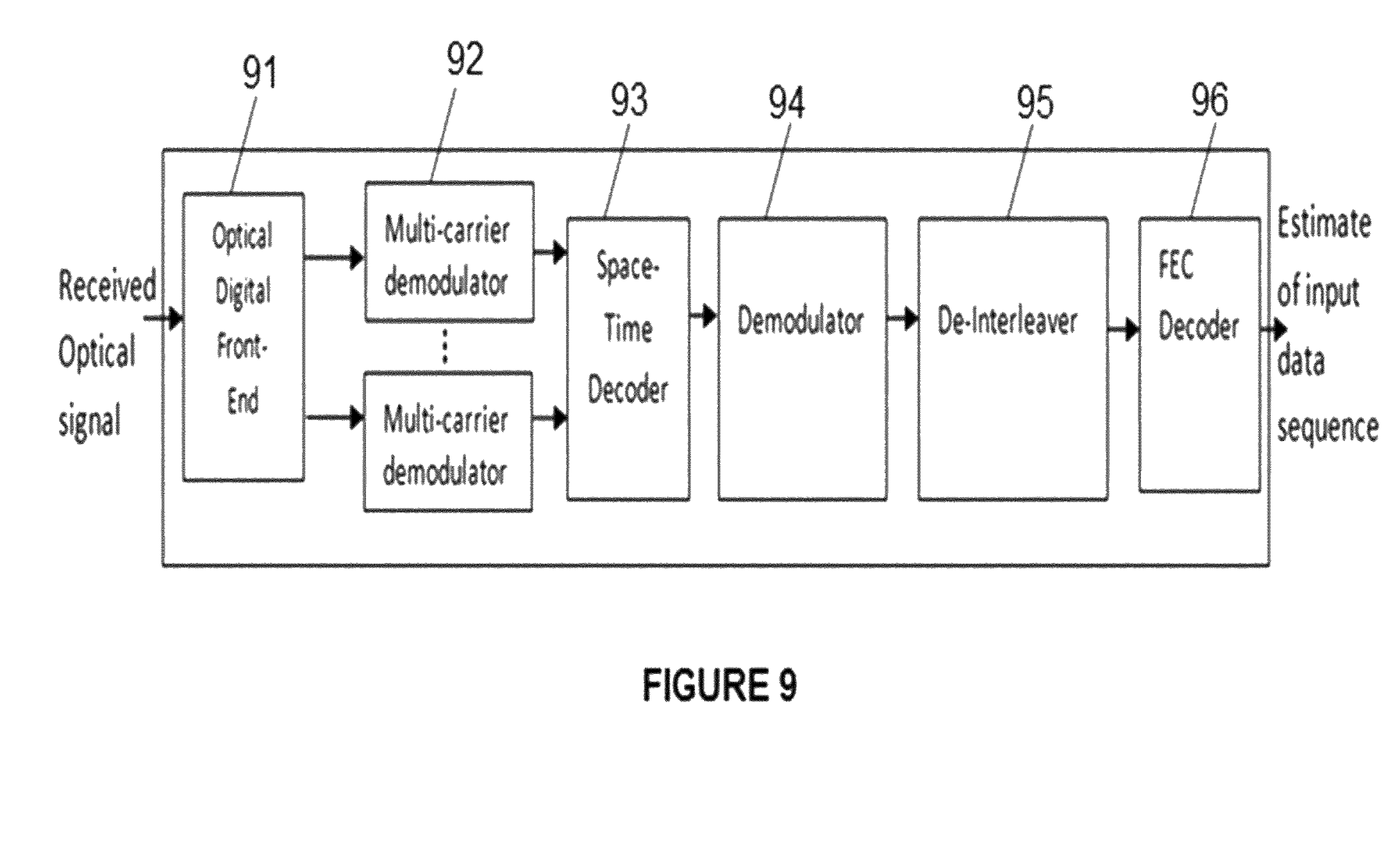
FIG. 9 is a block diagram illustrating the structure of an optical receiver according to some embodiments of the invention.
Figure 10:
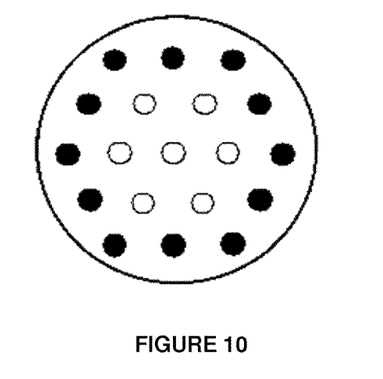
FIG. 10 illustrates a cross section view of a 19-cores homogeneous fiber in which an exemplary core selection method, according to some embodiments of the invention.

FIG. 9 is a block diagram of an optical receiver 15 according to some embodiments. The optical receiver 15 is configured to receive the optical signal transmitted by the optical transmitter 11 through the transmission channel 13 and to generate an estimate of the original input data sequence. Accordingly, the optical receiver 15 may comprise:

- an optical-digital front-end 91 configured to detect the optical signals, using for example one or more photodiodes, and to convert them into a digital signal. The optical-digital front-end 91 may comprise a FAN-OUT device (not illustrated in FIG. 9);
- a plurality of multi-carrier demodulators 92 configured to remove the cyclic prefix and generate a set of decision variables to be delivered to the Space-Time decoder 93;
- a Space-Time decoder 93 configured to generate an estimate of the modulated data sequence from the set of decision variables by applying a Space-Time decoding algorithm;
- a demodulator 94 configured to generate a binary sequence by performing a demodulation of the modulated data sequence estimated by the Space-Time decoder 93;
- a de-interleaver 95 configured to rearrange the order of the bits (in general the symbols) in the binary sequence delivered by the demodulator 94 to restore the original order of the bits; and
- a FEC decoder 96 (also referred to as 'an error correcting code decoder 96') configured to deliver an estimate of the input data sequence processed by the optical transmitter device 11 by applying a soft or hard-decision FEC decoder to the reordered binary sequence delivered by the de-interleaver 95. Exemplary soft-decision FEC decoders comprise the Viterbi algorithm.

The Space-Time decoder 93 may implement a Space-Time decoding algorithm chosen in a group consisting of a maximum likelihood decoder, a Zero-Forcing decoder, a Zero-Forcing Decision Feedback Equalizer, and a Minimum Mean Square Error decoder.

Exemplary maximum likelihood decoders comprise the sphere decoder, the Schnorr-Euchner decoder, the stack decoder, the spherical-bound-stack decoder.

In embodiments using single-carrier modulations, the plurality of multi-carrier modulators 92 may be replaced by a single modulator. Similarly, the multi-carrier demodulators 92 may be replaced by a single demodulator.

In some embodiments in which the FEC encoder 81 implements a concatenation of two or more forward error correcting codes, a corresponding structure may be implemented by the FEC decoder 96. For example, in embodiments based on a serial concatenation of an inner code and an outer code, the FEC decoder 96 may comprise an inner code decoder, a de-interleaver, and an outer code decoder (not shown in FIG. 9). In embodiments involving two codes in a parallel architecture, the FEC decoder 96 may comprise a de-multiplexer, a de-interleaver, and a joint decoder (not shown in FIG. 9).

The following description of certain embodiments of the invention will be made with reference to an optical communication system 100 using a single polarization, a single wavelength, a single carrier-modulation, a single error correcting code without Space-Time Coding, and a single-mode multi-core fiber, for illustration purposes only. However, the skilled person will readily understand that the various embodiments of the invention can also be applied in multi-core fibers in combination with polarization multiplexing using two polarizations and/or in combination with wavelength multiplexing using a plurality of wavelengths, and/or in combination with mode multiplexing using multi-mode fiber cores, and/or in combination with multi-carrier modulation formats, and/or in combination with Space-Time coding.

To facilitate the understanding of some embodiments of the invention, there follows some notations and definitions used hereinafter:

L designates the total length of the multi-core fiber in the optical fiber transmission channel 13;

K designates the number of fiber sections concatenated in the multi-core fiber (also referred to as 'fiber slices' or 'fiber spans');

d designates a correlation length;

$R_b$ designates a bending radius;

$N_c \geq 2$ designates the total number of cores in the multi-core fiber, the cores being numbered (i.e. each core being associated with a core number varying between 1 and $N_c$) such that a core is designated as core-n with n taking value between 1 and $N_c$;

$R_n$ designates the radius of core-n;

each core core-n with $n=1, \ldots, N_c$ is associated with core parameters denoted by $\{T_n; \lambda_n; E_n; N_{neigh,n}\}$, with $T_n$ designating the core type of core-n, $\lambda_n$ designating a core loss value associated with the core-n, $E_n$ designating the average received energy associated with the core-n, and $N_{neigh,n}$ designating the number of neighbor cores of the core-n.

$XT_{n,m}$ refers to a crosstalk coefficient (also referred to as 'inter-core crosstalk coefficient') quantifying the crosstalk (also referred to as 'inter-core cross-talk') between the core-n and the core-m with $n \neq m$;

$k_{n,m}$ refers to a coupling coefficient (also referred to as 'inter-core coupling') quantifying the coupling (also referred to as 'inter-core coupling') between the core-n and the core-m with $n \neq m$;

$\Delta\beta_{nm}$ stands for the propagation constant difference between the core-n and the core-m with $n \neq m$;

$N_{TX,sel}$ denotes a number of cores selected at the transmission side;

$N_{RX,sel}$ designates a number of cores selected at the reception side.

The various embodiments of the invention provide efficient core selection devices for performing core selection at the transmitter and/or at the receiver such that only a selected subset of cores among the available cores in the multi-core fiber is used for transmitting data in the optical transmission system 100 and/or data is received and decoded in the optical transmission system 100 using a subset of selected cores among the available cores at the optical receiver 15.

Accordingly and referring to FIG. 1, the optical transmission system 100 comprises a core selection device 17 configured to select a set of $N_{Tx,sel}$ transmit cores among the plurality of cores comprised in the multi-core fiber according to a transmit core selection criterion, the transmit core selection criterion being related to the one or more core parameters. The optical transmitter 11 is configured to transmit data only over the determined set of transmit cores.

In some embodiments, a core parameter associated with a core-n may be chosen in a group comprising a core type $T_n$, a core loss value $\lambda_n$, an average received energy $E_n$, and a number of neighbor cores $N_{neigh,n}$.

According to some embodiments, the transmit core selection criterion corresponds to the selection, among the plurality of cores core-n for $n=1, \ldots, N_c$, of a given number $N_{Tx,sel}$ of the cores associated with the maximum average received energy. In such embodiments, the core selection device 17 may be configured to apply a transmit core selection criterion consisting in selecting a number of cores which have the highest average received energy such that the selected cores denoted by $core_1, core_2, \ldots, core_{N_{TX,sel}}$ satisfy the maximization problem according to:

$$\{core_1, core_2, \ldots, core_{N_{TX,sel}}\} = \text{argmax}_{n=1, \ldots, N_c} E_n \qquad (1)$$

The core selection device 17 may be configured to previously determine the average received energy associated with each core of the plurality of cores comprised in the multi-core fiber offline by exciting all the cores with a unit energy and computing the average received energy per core at the optical receiver 15.

According to some embodiments in which the multi-core fiber is homogeneous, i.e. the core types associated with each of the plurality of cores comprised in the multi-core fiber are identical ($T_i = T_j$ for each $i \neq j$, $i=1, \ldots, N_c$ and $j=1, \ldots, N_c$), the core selection device 17 may be configured to apply transmit core selection criterion consisting in selecting, among the plurality of $N_c$ cores, a number $N_{Tx,sel}$ of the cores which are associated with the lowest number of neighbor cores such that the selected cores denoted by $core_1, core_2, \ldots, core_{N_{Tx,sel}}$ satisfy the minimization problem according to:

$$\{core_1, core_2, \ldots, core_{N_{TX,sel}}\} = \text{argmin}_{n=1, \ldots, N_c} N_{neigh,n} \qquad (2)$$

Figure 11:
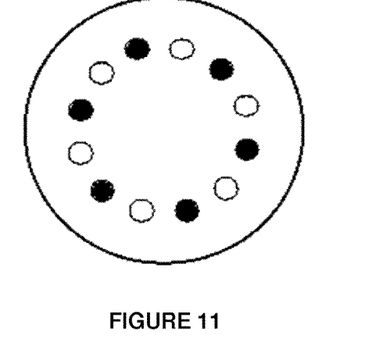
FIG. 11 illustrates a cross section view of a 12-cores homogeneous fiber in which an exemplary core selection method is applied, according to another embodiments of the invention.

FIG. 11 illustrates an example of core selection in a 19-cores homogeneous fiber in which the transmit core selection criterion is based on the number of neighbor cores associated with the cores of the multi-core fiber. Accordingly, the empty circles correspond to the unselected cores and the filled circles correspond to the set of transmit selected cores, each selected core being associated with the minimum number of neighbor cores compared with the number of neighbor cores associated with the unselected cores.

According to some embodiments in which the multi-core fiber is homogeneous and comprising an even number $N_c$ of cores, the core selection device 17 may be configured to group the plurality of cores $core_1, core_2, \ldots, core_{N_c}$ into pairs of cores denoted by $\{core_1, core_2\}, \{core_3, core_4\}, \ldots, \{core_{N_c-1}, core_{N_c}\}$, each pair of cores $\{core_i, core_{i+1}\}$ for $i=1, 3, 5, \ldots, N_c-1$ comprising two neighbor cores $core_i$ and $core_{i+1}$. In such embodiments, core selection device 17 may be configured to select a set of $N_{Tx,sel}$ transmit cores by applying a transmit core selection criterion consisting in selecting of a core $core_i$ or $core_{i+1}$ among each pair of cores $\{core_i, core_{i+1}\}$ for $i=1, 3, 5, \ldots, N_c-1$.

FIG. 11 illustrates an exemplary core selection in a 12-cores homogeneous fiber in which one core over two cores is selected.

According to other embodiments in which the multi-core fiber is heterogeneous, the core selection device 17 may be configured to select a set of $N_{Tx,sel}$ transmit cores by applying a transmit core selection criterion consisting in selecting, among the plurality of $N_c$ cores, a number $N_{Tx,sel}$ of cores which are associated with a predefined core type $T_{pred}$. A core $core_n$ comprised in the multi-core fiber for $n=1, \ldots, N_c$ is accordingly selected if the core type $T_n$ associated with the core $core_n$ is identical to the predefined core type $T_{pred}$.

According to some embodiments in which the multi-core fiber is heterogeneous, the core selection device 17 may be configured to select a set of $N_{Tx,sel}$ transmit cores by applying a transmit core selection criterion consisting in selecting, among the plurality of $N_c$ cores, a number $N_{Tx,sel}$ of the cores which are associated with the highest core loss values. Accordingly, the selected cores denoted by $core_1, core_2, \ldots, core_{N_{TX,sel}}$ satisfy the maximization problem expressed as:

$$\{core_1, core_2, \ldots, core_{N_{TX,sel}}\} = \text{argmax}_{n=1, \ldots, N_c} \lambda_n \qquad (3)$$

According to some embodiments, the core selection device 17 may be configured to previously determine each core loss value $\lambda_n$ associated with each core-n of the multi-core fiber depending on fiber parameters and misalignment loss values associated with the multi-core fiber.

According to some embodiments, the fiber parameters comprise a fiber length L, a number of cores $N_c \geq 2$ at least equal to two, crosstalk coefficients $XT_{n,m}$ with n, m ∈

$\{1, \ldots, N_c\}$, and coupling coefficients $k_{n,m}$ with n, m∈ $\{1, \ldots, N_c\}$, each crosstalk coefficient $XT_{n,m}$ representing a crosstalk between the core-n and the core-m with n≠m in the multi-core fiber, each coupling coefficient $k_{n,m}$ representing a coupling the core-n and the core-m with n≠m in the multi-core fiber.

The fiber parameters may further comprise a bending radius, a number of fiber slices K, the cladding diameter, the radius of each core of the multi-core fiber, and the type of each core of the multi-core fiber.

In some embodiments, the misalignment losses may rise due to the imperfections of the optical fiber at the fiber spans and of the connectors (e.g. the connectors between the FAN-IN/FAN-OUT devices and the input/output ends of the optical fiber transmission channel). Misalignment losses may comprise a misalignment chosen in a group comprising a longitudinal misalignment, a transverse misalignment, and angular an misalignment.

According to some embodiments, the misalignment losses may be modeled as random Gaussian variables. More specifically, the misalignment loss associated with core-n may be modeled as a random Gaussian variable of zero-mean and a standard deviation denoted by $\sigma_{(x,y),n}$ expressed according to:

$$\sigma_{(x,y),n} = \frac{r_d}{R_n} \quad (4)$$

In equation (4), $r_d$ designates the transverse displacement of the multi-core fiber in the 'x' and 'y' directions.

In embodiments in which the optical fiber transmission channel 13 experiences inter-core crosstalk effects and misalignment effects, the optical transmission channel 13 may be represented by an optical multiple-input multiple-output (MIMO) system described by the relation:

$$Y = H \cdot X + N \quad (5)$$

In equation (5):
X designates a complex-value vector of length $N_c$ comprising $N_c$ symbols transmitted over the optical transmission channel 13 such that the $n^{th}$ symbol is transmitted over the core-n with n=1, ..., $N_c$;
Y is a complex-value vector of length $N_c$ designating the received signal at the optical receiver 15,
H is a complex-value matrix of dimensions $N_c \times N_c$ designating the optical channel matrix and representing the undergone attenuations and the losses experienced by the cores during the optical signal propagation over the different cores in the multi-core fiber in addition to the misalignment losses, and
N is a real-value vector of length $N_c$ designating the optical channel noise.

According to some embodiments, the optical channel noise may be a White Gaussian Noise of zero-mean and variance $N_0$.

The inter-core crosstalk effects may be represented by a cross-talk channel matrix denoted by $H_{XT}$ expressed according to:

$$H_{XT} = \begin{bmatrix} XT_1 & XT_{1,2} & \ldots & XT_{1,N_c} \\ XT_{2,1} & \ddots & \ldots & XT_{2,N_c} \\ \vdots & \vdots & \ddots & \vdots \\ XT_{N_c,1} & XT_{N_c,2} & \ldots & XT_{N_c,N_c} \end{bmatrix} \quad (6)$$

In equation (6), the diagonal entries of the crosstalk channel matrix are given by $XT_n = 1 - \Sigma_{n \neq m} XT_{n,m}$. The crosstalk represents the exchanging energy between the cores and can be estimated based on the coupled-power theory, known to the person skilled in the art.

According to some embodiments in which the multi-core fiber is homogeneous, the crosstalk coefficients $XT_{n,m}$ quantifying the crosstalk between each core-n and core-m with n≠m are expressed according to:

$$XT_{n,m} = \frac{2k_{n,m}^2 R_b}{\beta^2 \Lambda} L \quad (7)$$

In equation (7), $\Lambda$ designates the core-to-core distance and $\beta^2$ is the propagation constant.

According to some embodiments in which the multi-core fiber is heterogeneous, the crosstalk coefficients $XT_{n,m}$ quantifying the crosstalk between each core-n and core-m with n≠m are expressed according to:

$$XT_{n,m} = \frac{2k_{n,m}^2}{\Delta \beta_{n,m}^2 d} L \quad (8)$$

According to some embodiments, the core selection device 17 may be configured to determine a core loss value $\lambda_n$ associated with each core core-n for n=1, ..., $N_c$ by applying a singular value decomposition to the optical channel matrix H representative of the optical fiber transmission channel 13.

The singular value decomposition of the optical channel matrix can be expressed according to:

$$H = U \cdot \Sigma \cdot V \quad (9)$$

In equation (9), the matrix $\Sigma$ is a $N_c \times N_c$ diagonal matrix given by:

$$\Sigma = \begin{bmatrix} \alpha_1 XT_1 & \ldots & 0 \\ \vdots & \ddots & \vdots \\ 0 & \ldots & \alpha_{N_c} XT_{N_c} \end{bmatrix} \quad (10)$$

In equation (10), $\alpha_i$ designates the total misalignment loss associated with the core core-i and $XT_i = 1 - \Sigma_{i \neq m} XT_{i,m}$ designates a total crosstalk coefficient quantifying the total crosstalk associated with the core core-i at the end of the optical transmission channel 13, the total crosstalk coefficient associated with the core core-i being dependent on the crosstalk coefficients quantifying the crosstalk between said core core-i and the remaining cores in the multi-core fiber.

The multi-core fiber is made of a concatenation of K fiber spans, each span is equivalent to a multiplication of a crosstalk channel matrix and a misalignment channel matrix. Accordingly, the optical MIMO system of equation (5) can be equivalently expressed according to:

$$Y = \sqrt{L} \prod_{k=1}^{K} ((H_{XT,k}) M_k) X + N \quad (11)$$

In equation (11):
L designates a normalization factor used to compensate the optical fiber link loss;
$H_{XT,k}$ designates the crosstalk channel matrix associated with the $k^{th}$ fiber span, and $M_k$ designates the misalignment channel matrix associated with the $k^{th}$ fiber span.

Using the fiber decomposition into fiber spans, the misalignment losses coefficients $\alpha_i$ may be given by:

$$\alpha_i = \prod_{k=1}^{K} \alpha_i^k = c \cdot \exp(Z_i); Z_i = \sum_{k=1}^{K} -b(dx_{k,i}^2 + dy_{k,i}^2) \quad (12)$$

In equation (12), $dx_{k,i}^2$ and $dy_{k,i}^2$ for $i=1, \ldots, N_c$ designate Chi-squared distributed random variables with one degree of freedom, a mean value equal to $(\sigma_{(x,y),i})^2$, and a variance equal to $2(\sigma_{(x,y),i})^4$.

Considering embodiments in which the number of fiber spans K is high, the inventors showed that each variable $Z_i$ can be modeled as a normally distributed variable with mean $\mu_{Z_i} = 2$ $Kb(\sigma_{(x,y),i})^2$ and variance $\sigma_{Z_i}^2 = 4$ $Kb^2\sigma_{(x,y)}^4$. Accordingly, the misalignment losses coefficients $\alpha_i$ can be modeled by a lognormal random variable with a mean value $\mu_{\alpha_i}$ and a variance value $\sigma_{\alpha_i}^2$ given respectively by:

$$\mu_{\alpha_i} = \exp(\mu_{Z_i} + \sigma_{Z_i}^2/2) \quad (13)$$

$$\sigma_{\alpha_i}^2 = (\exp(\sigma_{Z_i}^2) - 1) \cdot \mu_{\alpha_i}^2 \quad (14)$$

According to the derivation of the singular value decomposition of the optical channel matrix, the optical MIMO system of equation (5) can be expressed according to:

$$Y = \sqrt{L} \cdot U \cdot \begin{bmatrix} \alpha_1 XT_1 & \ldots & 0 \\ \vdots & \ddots & \vdots \\ 0 & \ldots & \alpha_{N_c} XT_{N_c} \end{bmatrix} V \cdot X + N = \quad (15)$$

$$\sqrt{L} \cdot U \cdot \begin{bmatrix} \lambda_1 & \ldots & 0 \\ \vdots & \ddots & \vdots \\ 0 & \ldots & \lambda_{N_c} \end{bmatrix} V \cdot X + N$$

According to equation (15), the core selection device 17 may be configured to determine the core loss value $\lambda_n$ associated with each core core-n, for $n=1, \ldots, N_c$, such that the core loss value $\lambda_n$ is a log normally distributed variable with mean $\mu_{\lambda_n} = \mu_{\alpha_n} XT_n$ and variance $\sigma_{\lambda_n}^2 = \sigma_{\alpha_n}^2$ the mean and the variance of each core loss value being dependent on the fiber parameters involving the total crosstalk coefficient $XT_n$ associated with said each core and on the misalignment losses rising in the mean and the variance of the lognormal distribution of the misalignment losses coefficients $\alpha_i$.

More specifically, the mean value $\mu_{\lambda_n}$ of each core loss value $\lambda_n$ associated with each core core-n of the multi-core fiber is a product between a first value and a second value, the first value $\mu_{\alpha_n}$ corresponding to the mean of the lognormal random variable $\alpha_n$ representing the total misalignment loss associated with the core core-n, the second value $XT_n^2$ corresponding to the square of the total crosstalk coefficient associated with said the core core-n. The variance value $\sigma_{\lambda_n}^2$ of each core loss value $\lambda_n$ associated with each core core-n of the multi-core fiber is the product between the total crosstalk coefficient $XT_2$ associated with the core core-n and a third value corresponding to the variance $\sigma_{\alpha_n}^2$ of the lognormal random variable $\alpha_n$ representing the total misalignment loss associated with the core core-n.

According to some embodiments, core selection may also be performed at the receiver side for receiving and decoding the transmitted optical signal transmitted by the optical transmitter 11 over the set of $N_{Tx,sel}$ transmit cores using a subset of the cores available at the receiver side. Accordingly, the core selection device 17 may be further configured to determine a set $N_{RX,sel}$ of receive cores among the plurality of $N_c$ cores according to a receive core selection criterion, the optical receiver 15 being configured to receive and decode the optical signals using the set of $N_{RX,sel}$ receive cores.

According to some embodiments the core selection device 17 may be configured to determine a set $N_{RX,sel} \geq N_{TX,sel}$ of receive cores, the number of receive cores being higher than or equal to the number of transmit cores. Accordingly, the optical receiver 15 may use either the receive cores corresponding to the selected transmit cores over which data has been transmitted by the optical transmitter 11 or use a subset of the totality of the available cores to receive and decode data. The core selection device 17 may be configured to determine the set of $N_{RX,sel}$ receive cores according to a trade-off criterion between performance and complexity.

According to some embodiments, the core selection device 17 may be configured to perform core selection (i.e. select a set of $N_{TX,sel}$ transmit cores used for core selection at the optical transmitter 11 and/or select a set of $N_{RX,sel}$ receive cores used for core selection at the optical receiver 15) during the installation of the optical transmission system 100 and the configuration of the optical transmitter 11 and/or the configuration of the optical receiver 15.

In other embodiments, the core selection device 17 may be configured to perform core selection offline after the installation of the optical transmission system 100. In particular, the core selection device 17 may be configured to perform core selection by selecting a set of transmit cores and/or a set of receive cores adaptively or periodically taking into account any replacement of the components of the optical transmission system 100 (e.g. the amplifiers). In such embodiments, the core selection device 17 may be configured to transmit the selected set of $N_{TX,sel}$ transmit cores (respectively the selected set of $N_{RX,sel}$ receive cores) to the optical transmitter 11 (respectively to the optical receiver 15).

There is also provided a method for core selection in an optical transmission system 100 in which data is transmitted over an optical fiber transmission channel 13 made of a multi-core fiber, optical signals carrying data propagate along the multi-core fiber according to a plurality of $N_c$ cores, each core core-n among the plurality of cores being associated with one or more core parameters. The method comprises determining a set of transmit cores among the plurality of cores according to a transmit core selection criterion, the transmit core selection criterion being dependent on the one or more core parameters associated with the cores of the multi-core fiber, the method comprising transmitting data over the determined set of transmit cores.

Figure 12:
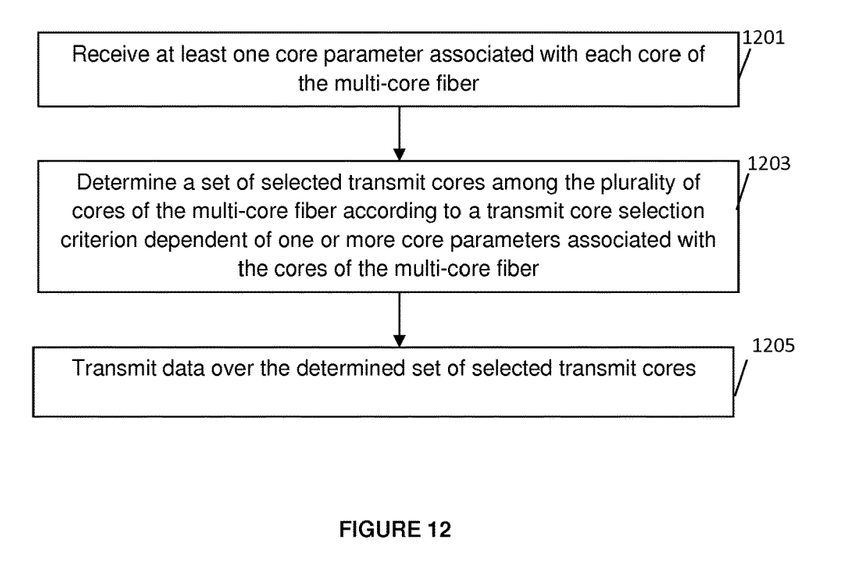
FIG. 12 is a flowchart illustrating core selection method in an optical transmission system, according to some embodiments of the invention.

FIG. 12 is a flowchart illustrating a method of core selection at the transmission in an optical transmission system 100 according to some embodiments of the invention in which a single polarization, a single wavelength, a single carrier uncoded modulation without the application of Space-Time coding, are used and each core of the multi-core fiber is a single-mode core.

At step 1201, at least one core parameter associated with each core of the multi-core fiber may be received.

In some embodiments, a core parameter associated with a core-n may be chosen in a group comprising a core type $T_n$, a core loss value $\lambda_n$, an average received energy $E_n$, and a number of neighbor cores $N_{neigh,n}$.

In some embodiments, each core loss value $\lambda_n$ associated with each core-n of the multi-core fiber may be previously determined depending on fiber parameters and misalignment loss values associated with the multi-core fiber. In particular, the core loss values associated with the cores of the multi-core fiber may be determined depending on the crosstalk coefficients and the misalignment losses coefficients according to equation (17).

In some embodiments, the fiber parameters comprise the number of cores $N_c \geq 2$, the length L of the fiber, crosstalk coefficients $XT_{n,m}$ with n, $m \in \{1, \ldots, N_c\}$, and coupling coefficients $k_{n,m}$ with n, $m \in \{1, \ldots, N_c\}$, each crosstalk coefficient $XT_{n,m}$ representing a crosstalk between the core-n and the core-m with $n \neq m$ in the multi-core fiber, each coupling coefficient $k_{n,m}$ representing a coupling the core-n and the core-m with $n \neq m$ in the multi-core fiber.

In some embodiments, the fiber parameters may further comprise the bending radius $R_b$, the cladding diameter, the number K of fiber slices, the radius of each core of the multi-core fiber, and the type $T_n$ of each core core-n of the multi-core fiber, with $n=1, \ldots, N_c$.

In some embodiments, misalignment losses comprise longitudinal misalignments, transverse misalignments, and angular misalignments.

In some embodiments, the misalignment losses values may be previously determined according to equation (4).

At step 1203, a set of $N_{TX,sel}$ transmit cores among the $N_c$ cores of the multi-core fiber may be determined according to a transmit core selection criterion related to one or more core parameters associated with the cores of the multi-core fiber.

According to some embodiments, the transmit core selection criterion may consist in selecting, among the plurality of cores core-n for $n=1, \ldots, N_c$, a number $N_{TX,sel}$ of the cores which are associated with the highest average received energy according to the optimization problem of equation (1).

In some embodiments in which the multi-core fiber is homogeneous, the transmit core selection criterion may consist in selecting, among the plurality of $N_c$ cores, a number $N_{TX,sel}$ of the cores which are associated with the lowest number of neighbor cores, according to the optimization problem of equation (2).

According to other embodiments in which the multi-core fiber is homogeneous, the transmit core selection criterion may consist in selecting a core among each two neighbor cores grouped in pairs of neighbor cores.

According to some embodiments in which the multi-core fiber is heterogeneous, the transmit core selection criterion may consist in selecting the cores which are associated with a core type identical to a predefined core type.

According to some embodiments in which the multi-core fiber is heterogeneous, the transmit core selection criterion may consist in selecting, among the plurality of $N_c$ cores, a number $N_{TX,sel}$ of the cores which are associated with the highest core loss values according to the optimization problem of equation (3).

At step 1205, data may be transmitted in the optical transmission system 100 over the determined set of transmit cores.

According to some embodiments, the method may further comprise core selection at the reception of the data propagating in the optical transmission system 100. In such embodiments, the method may comprise selecting a set $N_{RX,sel}$ of receive cores among the plurality of $N_c$ cores according to a receive core selection criterion, the optical signals carrying data propagating in the optical transmission system being received and decoded using the set of $N_{RX,sel}$ receive cores.

Although the various embodiments have been detailed in the case of single-core multi-mode fibers in which a single polarization, a single wavelength and single-carrier modulation are used, it should be noted that the invention can also be applied in multi-core multi-mode fibers in combination with polarization multiplexing using two polarizations and/or in combination with the use of wavelength multiplexing using several wavelengths, and/or using multi-carrier modulation formats.

Further, the invention is not limited to communication applications and may be integrated in other applications such as data storage and medical imaging. The invention may be used in several optical transmission systems, for example automotive industry applications, in oil or gas markets, in aerospace and avionics sectors, sensing applications, etc.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. An optical transmission system comprising an optical transmitter configured to transmit data over an optical fiber transmission channel comprising a multi-core fiber, said data being carried by one or more optical signals propagating along the multi-core fiber according to a plurality of cores, each core among said plurality of cores being associated with one or more core parameters, wherein the optical transmission system comprises a core selection device configured to select a set of transmit cores comprising at least one transmit core among said plurality of cores according to a transmit core selection criterion, said transmit core selection criterion being related to said one or more core parameters, each core parameter being chosen in a group, said group comprising a core type, a core loss value, an average received energy, and a number of neighbor cores, the optical transmitter being configured to transmit the data over said set of transmit cores.

2. The optical transmission system of claim 1, wherein the core selection device is configured to apply a transmit core selection criterion consisting in selecting a number of cores which have the highest average received energy.

3. The optical transmission system of claim 1, wherein the multi-core fiber is homogeneous and the core type associated with each of said plurality of cores are substantially identical, the core selection device being configured to apply a transmit core selection criterion consisting in selecting a number of cores which are associated with the lowest number of neighbor cores.

4. The optical transmission system of claim 1, wherein said multi-core fiber is homogeneous and comprises an even number of cores, the core selection device being configured to group said plurality of cores into pairs of cores, each pair of cores comprising two neighbor cores, the core selection device being configured to apply a transmit core selection criterion consisting in selecting a core among each pair of cores.

5. The optical transmission system of claim 1, wherein said multi-core fiber is heterogeneous, the core selection device being configured to apply a transmit core selection criterion consisting in selecting a number of cores which are associated with a predefined core type.

6. The optical transmission system of claim 1, wherein said multi-core fiber is heterogeneous, the core selection device being configured to apply a transmit core selection criterion consisting in selecting a number of the cores which are associated with the highest core loss values.

7. The optical transmission system of claim 1, wherein said multi-core fiber is associated with fiber parameters and misalignment loss values, the core selection device being configured to determine each core loss value associated with each core of the multi-core fiber depending on said fiber parameters and misalignment loss values.

8. The optical transmission system of claim 7, wherein said fiber parameters comprise a fiber length, a number of cores at least equal to two, crosstalk coefficients, and coupling coefficients, each crosstalk coefficient representing a crosstalk between two cores in said multi-core fiber, each coupling coefficient representing a coupling between two cores in said multi-core fiber.

9. The optical transmission system of claim 7, wherein said misalignments loss values represent a misalignment of the multi-core fiber chosen in a group comprising a longitudinal misalignment, a transverse alignment, and an angular alignment.

10. The optical transmission system of claim 7, wherein the core selection device is configured to determine each core loss value associated with each core of the multi-core fiber as a random variable of a lognormal distribution defined by a mean value and a variance value, said mean value and variance value being dependent on the fiber parameters and the misalignments loss values.

11. The optical transmission system of claim 10, wherein the mean value of each core loss value associated with each core of the multi-core fiber is a product between a first value and a second value, the first value corresponding to the mean of a lognormal random variable representing a total misalignment loss associated with each core, the second value corresponding to a total crosstalk coefficient associated with each core, the total crosstalk coefficient associated with a given core being determined from the crosstalk coefficients representing the crosstalk between said given core and the cores of the multi-core fiber different from said given core, the variance value of each core loss value associated with each core of the multi-core fiber being the product between the square of the total crosstalk coefficient associated with said each core and a third value corresponding to the variance of said lognormal random variable representing the total misalignment loss associated with said each core.

12. The optical transmission system of claim 1, wherein the optical transmission system further comprises an optical receiver configured to receive and decode the optical signals carrying data transmitted over said set of selected transmit cores, the core selection device being further configured to determine a set of receive cores among said plurality of cores according to a receive core selection criterion, said optical receiver being configured to receive and decode said optical signals using said set of receive cores.

13. The optical transmission system of claim 1, wherein the core selection device is configured select a set of transmit cores and/or a set of receive cores adaptively or periodically taking into account any replacement of optical components of the optical transmission system.

14. A method for core selection in an optical transmission system wherein data is transmitted over an optical fiber transmission channel comprising a multi-core fiber, said data being carried by one or more optical signals propagating along the multi-core fiber according to a plurality of cores, each core among said plurality of cores being associated with one or more core parameters, wherein the method comprises selecting a set of transmit cores comprising at least one transmit core among said plurality of cores according to a transmit core selection criterion, said transmit core selection criterion being related to said one or more core parameters, each core parameter being chosen in a group comprising a core type, a core loss value, an average received energy, and a number of neighbor cores, the method comprising transmitting the data over said set of transmit cores.

* * * * *